US012180036B2

(12) United States Patent
Kashiwakura

(10) Patent No.: US 12,180,036 B2

(45) Date of Patent: Dec. 31, 2024

(54) ELEVATOR MOTOR MOUNTING STRUCTURE

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 0 days.

(21) Appl. No.: 18/228,877

(22) Filed: Aug. 1, 2023

(65) Prior Publication Data

US 2024/0101394 A1 Mar. 28, 2024

(30) Foreign Application Priority Data

Sep. 28, 2022 (JP) ................................ 2022-154576

(51) Int. Cl.
*B66B 13/08* (2006.01)

(52) U.S. Cl.
CPC .................................... *B66B 13/08* (2013.01)

(58) Field of Classification Search
CPC ... B66B 13/08; B66B 11/0035; B66B 11/004; B66B 11/0045; B66B 11/0206; B66B 13/06; E05F 15/643
See application file for complete search history.

(56) References Cited

U.S. PATENT DOCUMENTS 2,166,527 A * 7/1939 Johnson .................. B66B 13/08 49/138
4,177,881 A * 12/1979 Kappenhagen ......... B66B 13/08 187/334
6,513,628 B2 * 2/2003 Mollenauer ............. B66B 13/30 187/334
7,331,141 B2 * 2/2008 Gilchrist ................. E05F 15/42 49/123
9,038,316 B2 * 5/2015 Von Gerichten ...... E05D 15/063 49/425
2011/0101198 A1 * 5/2011 Trach .................. B66B 11/0045 248/674
2011/0240828 A1 * 10/2011 Landry ................. B66B 19/005 248/669

FOREIGN PATENT DOCUMENTS

JP H1303282 A 12/1989
JP 200334477 A 2/2003
JP 2003246568 A * 9/2003
JP 2005520757 A * 7/2005
JP 2011105486 A * 6/2011
JP 2013133209 A 7/2013
JP 202294573 A 6/2022

* cited by examiner

*Primary Examiner* — Michael R Mansen
*Assistant Examiner* — Michelle M Mudwilder
(74) *Attorney, Agent, or Firm* — The Webb Law Firm

(57) ABSTRACT

An elevator motor mounting structure includes a bracket attachment part arranged above a car entrance, a bracket for supporting a motor, and a bolt for fixing the bracket to the bracket attachment part. The bracket includes a cutout that allows a shank of the bolt to enter the cutout when the bracket is attached to the bracket attachment part. The cutout has an entrance-direction cutout portion that extends inward of a car from a side end of the bracket in which the side end faces outward in an entrance direction of the car, and a width-direction cutout portion that extends from an inner end of the entrance-direction cutout portion in a width direction of the car entrance.

3 Claims, 17 Drawing Sheets

ELEVATOR MOTOR MOUNTING STRUCTURE

CROSS-REFERENCE TO RELATED APPLICATION

This application claims priority to Japanese Patent Application No. 2022-154576 filed Sep. 28, 2022, the disclosure of which is incorporated herein by reference in its entirety.

BACKGROUND OF THE INVENTION

Field of the Invention

The present invention relates to an elevator motor mounting structure for mounting a motor for opening and closing operation of a car door.

Description of the Related Art

In an elevator, a car door is opened and closed generally by means of, as a driving source, a motor disposed on an upper end of a vertical frame disposed on an upper side of a car entrance. Also, a landing door is opened and closed in association with the opening and closing of the car door by being engaged with the car door.

The vertical frame includes a horizontal part for mounting the motor. The horizontal part is formed by bending an upper end of the vertical frame 90 degrees toward a far side in a depth direction of a car. While a hole formed in a bracket with the motor mounted thereon is aligned with a through hole formed in the horizontal part, a bolt is inserted through the hole of the bracket and the through hole of the horizontal part. In this state, a nut is threaded into and tightened with a downwardly projecting end of the thus inserted bolt to fix the bracket with the motor mounted thereon to the horizontal part and thereby allow the motor to be mounted on the horizontal part (see, for example, FIG. 2 of JP 2022-94573 A).

Meanwhile, there are needs for replacement of the motor due to, for example, the malfunction or degradation over time. At the time of the replacement of the motor, the bolt which is fixing the bracket with the motor mounted thereon is loosened to allow the motor to be removed. At the time of removing the bolt, the motor may fall downward unless a worker or the like supports the motor by one hand while loosening and removing the bolt by another hand. Therefore, the worker or the like needs to carefully remove the bolt by one hand while supporting the motor by another hand, which causes a trouble of making it difficult to remove the motor. Also in a case where a new motor is mounted after the existing motor is removed, the worker or the like needs to insert the bolt from the hole of the bracket into the through hole formed in the horizontal part by one hand, while supporting the motor by another hand and simultaneously aligning the hole of the bracket with the motor mounted thereon with the through hole, which causes a trouble of making the operation difficult. Meanwhile, in a case where the motor is installed on an outer side of a car entrance in a width direction of the car entrance, there is a room for improvement since the operation from above the car make the replacement more difficult.

SUMMARY OF THE INVENTION

Therefore, it is an object of the invention to provide an elevator motor mounting structure that enables easy replacement of a motor.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An elevator motor mounting structure of the present invention including: a bracket attachment part which a frame arranged above a car entrance includes; a bracket that is attached to the bracket attachment part and supports a motor for opening and closing operation of a car door; a bolt for fixing the bracket to the bracket attachment part while passing through the bracket attachment part, in which the bracket includes a cutout that allows a shank of the bolt to enter the cutout when the bracket is attached to the bracket attachment part of the frame, and the cutout has, when an entrance direction of the car entrance in a plan view is a first direction and a width direction of the car entrance orthogonal to the first direction in a plan view is a second direction, an entrance-direction cutout portion that extends inward of a car from a side end of the bracket in the first direction, the side end facing outward of the car from the car entrance in the first direction, and a width-direction cutout portion that extends from an inner end of the entrance-direction cutout portion along the second direction.

Further, in the elevator motor mounting structure of the present invention, it can be configured such that the bolt is composed of a plurality of bolts and the cutout is composed of a plurality of cutouts, respectively, the plurality of cutouts include at least one first cutout and at least one second cutout, the at least one first cutout has the entrance-direction cutout portion and a first width-direction cutout portion that extends from the entrance-direction cutout portion toward one side in the second direction, the at least one second cutout has the entrance-direction cutout portion and a second width-direction cutout portion that extends from the entrance-direction cutout portion toward an other side in the second direction, and the bracket attachment part further includes a plurality of first penetrating parts configured to allow the bolt located at the inner end of the entrance-direction cutout portion of the at least one first cutout to move toward one end side of the first width-direction cutout portion, and allow the bolt located at the inner end of the entrance-direction cutout portion of the at least one second cutout to move toward an other end side of the second width-direction cutout portion.

Further, the elevator motor mounting structure of the present invention can be configured to include a clamping member through which shanks of the bolts pass so as to clamp the bracket between the bracket attachment part and the clamping member, the clamping member including: a base part arranged along the bracket attachment part; and a contact part arranged at an end on the inner side in the first direction in the base part and configured to come into contact with the motor to block the motor from moving outward in the first direction, the base part having a plurality of second penetrating parts arranged to correspond in position to the plurality of first penetrating parts of the bracket attachment part to allow movement of the bolts.

Further, in the elevator motor mounting structure of the present invention, it can be configured such that the base part extends in the first direction and the second direction, the contact part extends in the second direction and a vertical direction, and a corner formed on a boundary between the contact part and the clamping part has an arc shape with a certain radius of curvature or is a chamfered part.

Further, the elevator motor mounting structure of the present invention can be configured to include a cover member that is attached to the bracket and covers the motor from the inner side in the first direction, in which the cover member has a covering part extending from a position inside the contact part to a position outside the contact part in the second direction to cover from above a cable that projects toward the one side of the motor in the second direction, the bracket has a lateral side part extending upward from a position on the one side of the motor in the second direction and covering the motor when viewed from the second direction, and the lateral side part has a through hole to guide the cable to the outside.

BRIEF DESCRIPTION OF THE DRAWINGS

The aforementioned features and the other features of the present invention will be clarified by the following description and figures illustrating the embodiments of the present invention.

DESCRIPTION OF THE INVENTION

Figure 1:
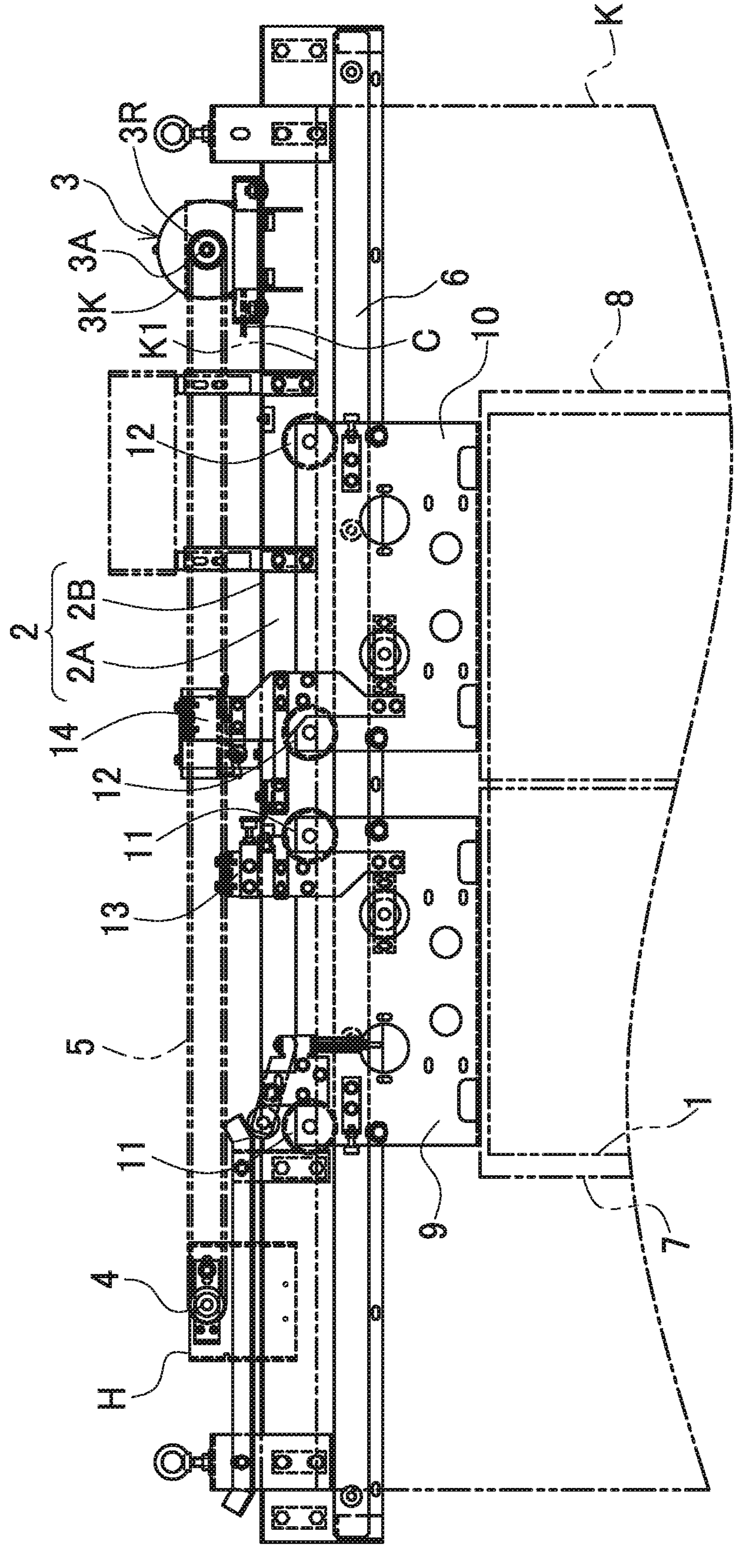
FIG. 1 is a schematic front view of a car door driving device including an elevator motor mounting structure of the present invention as viewed from a landing floor side.

The elevator motor mounting structure of this embodiment is an elevator motor mounting structure including a bracket that is configured to be mounted on a horizontal part of a frame that is arranged above a car entrance to support a motor for opening and closing operation of a car door. A bolt for fixing the bracket is provided in the horizontal part in a state of passing through the horizontal part. The bracket includes a cutout for allowing the insertion of a shank of the bolt. The cutout includes a first cutout portion extending from a car entrance side end to a far side of a depth direction, and a second cutout portion extending from the far side end of the depth direction of the first cutout portion in a direction substantially orthogonal to the first cutout portion.

The elevator motor mounting structure can be configured such that: the bolt is composed of two or more bolts and the cutout is composed of two or more cutouts; at least one cutout out of the two or more cutouts includes the first cutout portion and the second cutout portion extending from the far side end of the depth direction of the first cutout portion toward one side in a direction substantially orthogonal to the first cutout portion; at least one cutout out of the remaining one(s) of the two or more cutouts includes the first cutout portion and a second cutout portion extending from the far side end of the depth direction of the first cutout portion toward an opposite side to the one side in a direction substantially orthogonal to the first cutout portion; and the horizontal part includes a plurality of grooves for allowing the bolt located at the far side end of the depth direction of the first cutout portion of the at least one cutout to move to one side of the second cutout portion extending in the one direction, and allowing the bolt located at the far side end of the depth direction of the first cutout portion of the other cutout to move to the other end side of the second cutout portion extending in the other direction.

The elevator motor mounting structure can further include a clamping member through which shanks of the bolts pass so as to clamp the bracket between the horizontal part and the clamping member, in which the clamping member includes a contact part that is arranged on a side away from the car entrance and configured to come into contact with the motor to block the motor from moving toward the car entrance side, and include a plurality of second grooves corresponding in position to the plurality of grooves of the horizontal part to allow the movement of the bolts.

The elevator motor mounting structure can be further configured such that the contact part is formed by bending a part of the clamping member on a side away from the car entrance, and a corner formed by bending the contact part has an arc shape with a certain radius of curvature or is a chambered part.

The elevator motor mounting structure can be further configured such that a cover member for covering the far side of the depth direction of the motor is attached to the bracket; the cover member has a covering part extending from the far side of the depth direction to the near side of the contact part to cover from above a cable that projects toward the lateral side of the motor; the bracket includes a lateral side part located on one side of the cable in a frontage direction and extending upward to cover the lateral side of the motor; and the lateral side part has a through hole formed to guide the cable to the outside.

The elevator motor mounting structure of this embodiment includes a bracket attachment part which a frame arranged above a car entrance includes; a bracket that is attached to the bracket attachment part and supports a motor for opening and closing operation of a car door; a bolt for fixing the bracket to the bracket attachment part while passing through the bracket attachment part, in which the bracket includes a cutout that allows a shank of the bolt to enter the cutout when the bracket is attached to the bracket attachment part of the frame. The cutout has, when an entrance direction of the car entrance in a plan view is a first direction and a width direction of the car entrance orthogonal to the first direction in a plan view is a second direction, an entrance-direction cutout portion that extends inward of a car from a side end of the bracket in the first direction, the side end facing outward of the car from the car entrance in the first direction, and a width-direction cutout portion that extends from an inner end of the entrance-direction cutout portion along the second direction.

According to this embodiment, the tightened bolt is loosened for removing the motor when the replacement of the motor is performed. At this time, even when the bolt is loosened, the width-direction cutout portion suppresses the bracket from being moved inward in the first direction (i.e., depth direction), and thus the bracket is suppressed from being released from the bolt. Then, the bracket is moved to allow the shank of the bolt located in the width-direction cutout portion to be moved to the entrance-direction cutout portion. Thereafter, the bracket is moved inward in the first direction to allow the shank of the bolt that has moved inward in the first direction of the entrance-direction cutout portion to move outward in the first direction of the entrance-direction cutout portion, so that the bracket is released from the shank of the bolt, and thereby the motor is removed. Next, when a new motor for replacement is mounted, the bracket is moved to allow the shank of the bolt to enter the entrance-direction cutout portion extending inward in the first direction of the bracket which supports the motor. Next, the bracket is moved to move the shank of the bolt from an inner end in the first direction of the entrance-direction cutout portion to the width-direction cutout portion, so that the width-direction cutout portion suppresses the bracket from being moved inward in the first direction and being released from the shank of the bolt even when the bracket is released from the hand. In this state, the bracket that is supporting the motor does not need to be supported by the hand. Thus, only by tightening the bolt, the bracket is fixed to the bracket attachment part of the frame and the mounting of a new motor is completed. In consequence, the replacement of the motor can be easily made.

Further, the elevator motor mounting structure of this embodiment can be further configured such that: the bolt is composed of a plurality of bolts and the cutout is composed of a plurality of cutouts, respectively; the plurality of cutouts include at least one first cutout and at least one second cutout; the at least one first cutout has the entrance-direction cutout portion and a first width-direction cutout portion that extends from the entrance-direction cutout portion toward one side in the second direction; the at least one second cutout has the entrance-direction cutout portion and a second width-direction cutout portion that extends from the entrance-direction cutout portion toward an other side in the second direction; and the bracket attachment part further includes a plurality of first penetrating parts configured to allow the bolt located at the inner end of the entrance-direction cutout portion of the at least one first cutout to move toward one end side of the first width-direction cutout portion, and allow the bolt located at the inner end of the entrance-direction cutout portion of the at least one second cutout to move toward an other end side of the second width-direction cutout portion.

According to the aforementioned configuration that includes the first cutout including the first width-direction cutout portion that extends from the inner end of the first direction of the entrance-direction cutout portion toward one side in the second direction and the second cutout including the second width-direction cutout portion that extends from the inner end of the first direction of the entrance-direction cutout portion toward the other side in the second direction, the plurality of bolts are loosened when the motor is removed for replacing the existing motor. Even when the bolts are loosened, the first width-direction cutout portion and the second width-direction cutout portion suppress the bracket from being moved inward in the first direction, thereby suppressing the bracket from being released from the bolts. Thereafter, the bolt located at the one end of the second direction of the first width-direction cutout portion in the one first cutout is moved to the inner end of the first direction of the entrance-direction cutout portion of the at least one first cutout. At the same time, the bolt located at the other end of the second direction of the second width-direction cutout portion in the one second cutout is moved to the inner end of the first direction of the entrance-direction cutout portion of the one second cutout. Thereafter, the bracket is moved inward in the first direction to move the shanks of the bolts, which have been moved inward in the first direction in the plurality of the entrance-direction cutout portions, outward in the first direction of the entrance-direction cutout portion. Thereby, the plurality of cutouts of the bracket are released from the plurality of the shanks of the bolts to remove the motor. Next, for mounting a new motor, the bracket is moved to allow the shanks of the bolts corresponding to the plurality of entrance-direction cutout portions to enter the bracket. Next, the bolt located at the inner end in the first direction of the entrance-direction cutout portion in the one first cutout is moved to one end in the second direction of the first width-direction cutout portion in the one first cutout. At the same time, the bolt located at the inner end in the first direction of the entrance-direction cutout portion in the one second cutout is moved to the other end in the second direction of the second width-direction cutout portion in the one second cutout. In this state, the bracket that is supporting the motor does not need to be supported by the hand. Thus, only by tightening the plurality of bolts, the bracket is fixed to the bracket attachment part of the frame and the mounting of the motor is completed. In consequence, the replacement of the motor can be easily made.

Further, the elevator motor mounting structure of this embodiment can be further configured to include a clamping member through which shanks of the bolts pass so as to clamp the bracket between the bracket attachment part and the clamping member. Also, it can be configured such that the clamping member includes: a base part arranged along the bracket attachment part; and a contact part arranged at an end on the inner side in the first direction in the base part and configured to come into contact with the motor to block the motor from moving outward in the first direction, and the base part has a plurality of second penetrating parts arranged to correspond in position to the plurality of first penetrating parts of the bracket attachment part to allow movement of the bolts.

By the inclusion of the contact part in the clamping member for clamping the bracket between the bracket attachment part and the clamping member as described above, the motor can be prevented from moving toward the car entrance side and falling in an elevator shaft through the car moves up and down, by coming into contact with the contact part when the bolts are loosened to remove the bracket. The clamping member also includes the plurality of second penetrating parts corresponding in position to the plurality of first grooves in the bracket attachment part, so that the bolts can be smoothly moved.

Further, the elevator motor mounting structure of this embodiment can be further configured such that the base part extends in the first direction and the second direction, the contact part extends in the second direction and a vertical direction, and a corner formed on a boundary between the contact part and the clamping part has an arc shape with a certain radius of curvature or is a chamfered part.

By the corner having an arc shape with a certain radius of curvature or being a chamfered part as described above, when the bracket is inserted between the clamping member and the bracket attachment part, the bracket is pressed to the arc shaped or chamfered part to allow the clamping member to easily move upward while expanding a gap relative to the bracket attachment part. Thus, the operation to insert the bracket becomes easy.

Further, the elevator motor mounting structure of this embodiment can be configured to include a cover member that is attached to the bracket and covers the motor from the inner side in the first direction, in which the cover member has a covering part extending from a position inside the contact part to a position outside the contact part in the second direction to cover from above a cable that projects toward the one side of the motor in the second direction, the bracket has a lateral side part extending upward from a position on the one side of the motor in the second direction and covering the motor when viewed from the second direction, and the lateral side part has a through hole to guide the cable to the outside.

As described above, by the cover member for covering the motor from the inner side in the first direction being attached to the bracket, the rigidity of the motor casing can be improved, and thereby the motor is protected against external shocks. Further, the covering part of the cover member and the lateral side part of the bracket cover the connecting part at a base part of the cable from above and the lateral side, and thus the cable drawn out to the outside via the through hole that is formed in the lateral side part of the bracket can be wired to a desired position.

According to the above embodiments, it is possible to provide an elevator motor mounting structure that enables easy replacement of a motor by the cutouts that allow the shanks of the bolts to enter the bracket are formed in the bracket.

Hereinafter, an embodiment of the elevator motor mounting structure according to the present invention will be described with reference to the drawings.

FIG. 1 shows a car door driving device including the elevator motor mounting structure. FIG. 1 is a view of the car door driving device as viewed from a landing floor side. In FIG. 1, a frame 2 (also referred to as a support frame) extending along the frontage direction (i.e., right-left direction of FIG. 1) of a car entrance 1 and having a vertical plate shape (specifically, plate shape extending in the vertical direction and the frontage direction) is fixed to the wall part of a car K above the car entrance 1. The frame 2 has a vertical part 2A that faces the wall part of the car K arranged above the car entrance 1, and a bracket attachment part 2B that is connected to an upper end of the vertical part 2A. The bracket attachment part 2B of this embodiment has a horizontal part 2B (see FIG. 2) extending from the upper end of the vertical part 2A toward the landing floor side (i.e., front side in the depth direction of the car K) while being oriented at 90 degrees relative to the vertical part 2A (i.e., extending in the vertical direction or substantially vertical direction). In the following description, the frontage direction of the car K (i.e., second direction) is referred to as the right-left direction, the near side in the depth direction of the car K (i.e., outer side in the first direction) is referred to as the front side, and the far side in the depth direction of the car K (i.e., inner side in the first direction of the car K) is referred to as the rear side.

A motor 3 is fixed to one end in the right-left direction of the car entrance 1 in the horizontal part 2B of the frame 2, that is, at the outer side of the width of the car entrance in the width direction, via a bracket 15 and a clamping member 22 (see FIG. 2) to be described later. As shown in FIG. 1, this motor 3 is arranged above an upper end K1 of the car K. Accordingly, the replacement of the motor 3 is performed from above the car K.

A drive pulley 3R is attached to a drive shaft 3A of the motor 3 to rotate with the drive shaft 3A. An idler pulley 4 is disposed at the other end (i.e., left end) in the right-left direction of the car entrance 1 in the frame via a plate member H to cause the rotation axis of the idler pulley 4 to be located at the same height as the drive shaft 3A of the motor 3. An annular body formed by a belt (or can be a rope, a chain, etc.) is hung on (wound around) the drive pulley 3R and the idler pulley 4.

A door rail 6 extending along the right-left direction of the car entrance 1 is attached to a lower part on a front surface side of the frame 2. A first car door 7 and a second car door 8 are hung to the lower part on a front surface side of the frame 2. The first car door 7 and the second car door 8 are hung from the door rail 6 via door hangers 9, 10. The door hangers 9, 10 respectively have a pair of right and left rollers 11, 11, and a pair of right and left rollers 12, 12 configured to roll along the door rail 6. Each of the first car door 7 and the second car door 8 has a substantially rectangular and vertically elongated shape.

The door hanger 9, that is, one (on the left side) out of the door hangers 9, 10 for respectively hanging the first car door 7 and the second car door 8 is connected to the lower part of the annular body 5 via a first coupling member 13. The door hanger 10, that is, the other one (on the right side) out of the door hangers 9, 10 is connected to the upper part of the annular body 5 via a second coupling member 14.

When the motor 3 is driven and rotated in one direction to rotate the annular body 5 in one direction, the first car door 7 and the second car door 8 at the closed positions separate from each other to respectively move to the opening positions. When the motor 3 is driven and rotated in the other direction to rotate the annular body 5 in the other direction, the first car door 7 and the second car door 8 at the opening positions become close to each other to respectively move to the closed positions.

The motor 3 is fixed by a plurality (4 bolts in FIG. 4) of bolts 16, 17 (see FIG. 4), while being mounted on bracket 15. The plurality of bolts 16, 17 are composed of a pair of bolts 16, 16 arranged in the an end part on the front side in a front-back direction of the car at a first distance in the right-left direction, and a pair of bolts 17, 17 arranged in an end part on the rear side in the front-back direction of the car at a second distance larger than the first distance. A bottom cover 18 (see FIG. 2) covering the bottom of the motor 3 is arranged on the bottom of the motor 3.

Figure 5A:
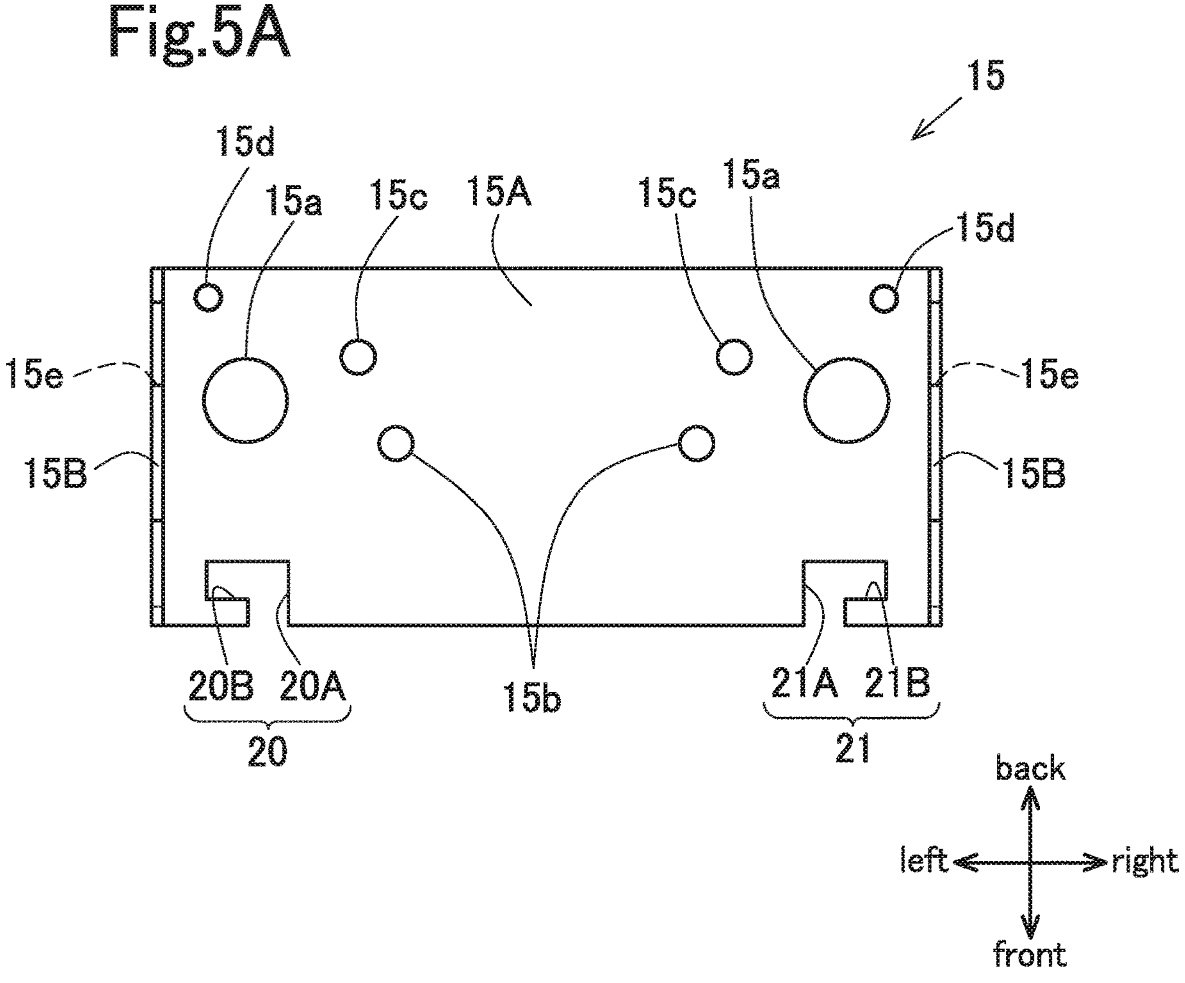
FIG. 5A is a plan view of a bracket on which a motor is mounted.
Figure 5B:
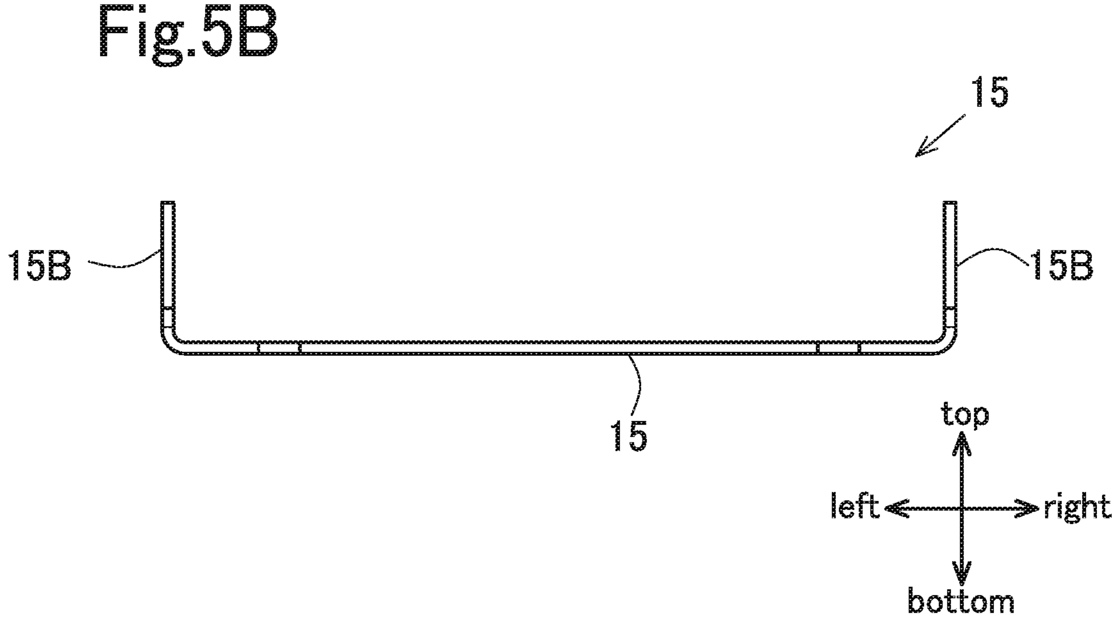
FIG. 5B is a rear view of the bracket.
Figure 5C:
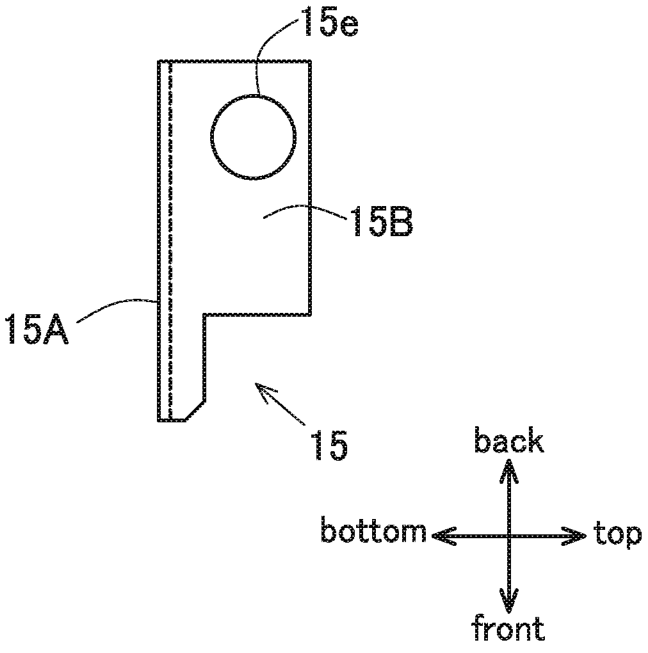
FIG. 5C is a side view of the bracket.

The bracket 15 is made of metal and, as shown in FIG. 5A, FIG. 5B, and FIG. 5C, includes a bottom plate 15A having a rectangular shape elongated in the right-left direction, and a pair of lateral side parts 15B, 15B extending from both the left and right ends of the bottom plate 15A while being oriented at 90 degrees relative to the bottom plate 15A (that is, extending upward). Each of the lateral side parts 15B, 15B includes a first part arranged on the near side in the front-back direction and having a small height in the vertical direction, and a second part arranged on the rear side of the first part in the front-back direction and having a height larger than that of the first part.

The bottom plate 15A includes a pair of left and right circular through holes 15*a*, 15*a* for allowing a later-described cable C to pass downwardly therethrough. Also, the bottom plate 15A includes a pair of left and right screw holes

Figure 7A:
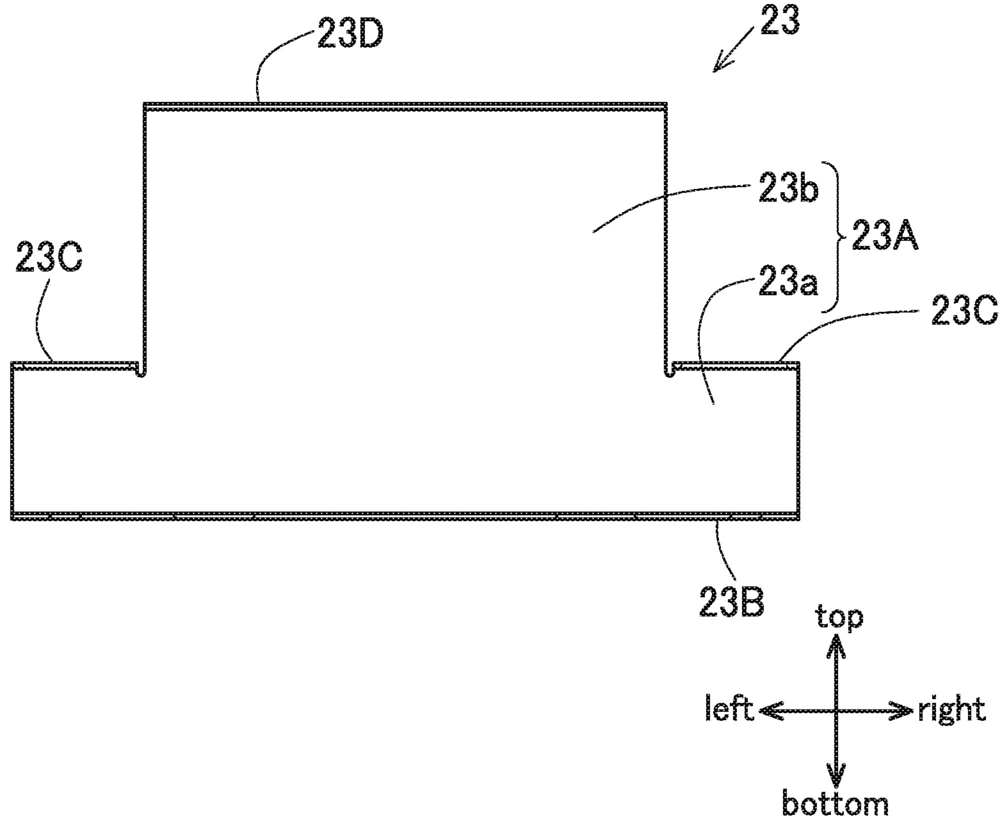
FIG. 7A is a front view of a cover member for covering the motor.
Figure 7B:
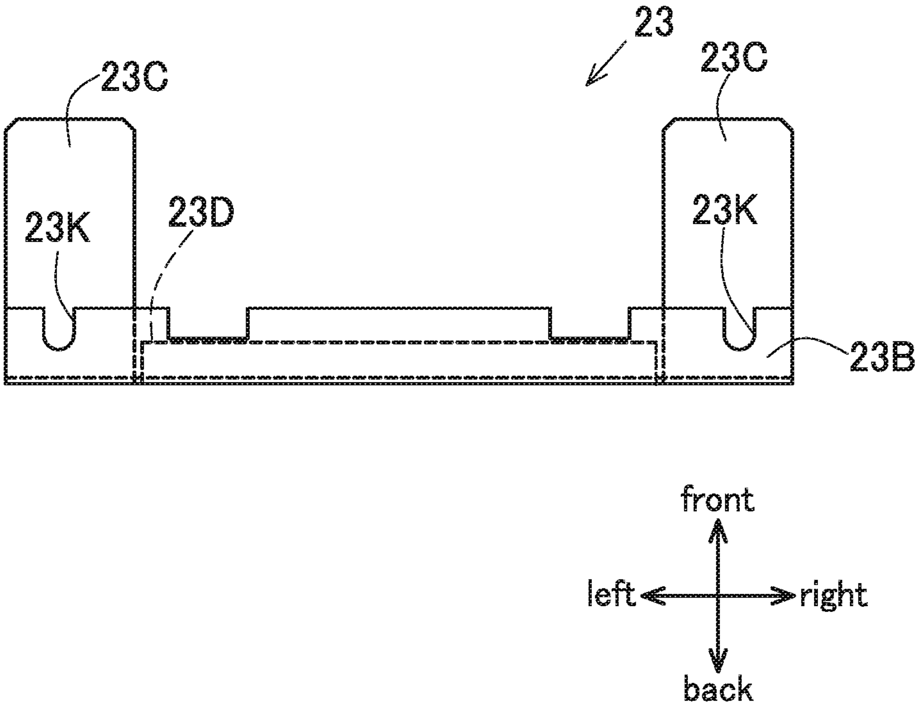
FIG. 7B is a bottom view of the cover member.
Figure 7C:
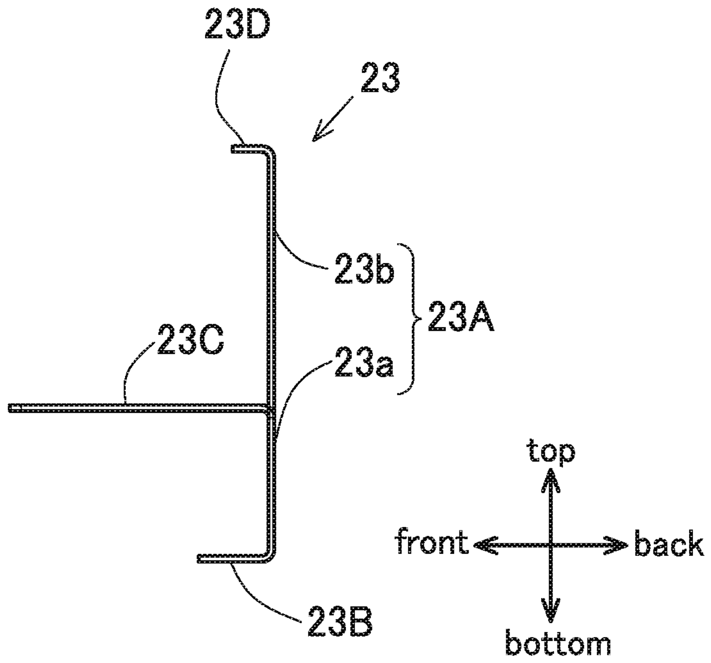
FIG. 7C is a side view of the cover member.

15*d*, 15*d* for allowing a later-described cover member 23 (see FIG. 7A to FIG. 7C) to be fixed to the bracket 15 by bolts. The lateral side parts 15B, 15B each are configured to cover the lateral side of the lower part of the motor 3 and has a through hole 15*e* for guiding the later-described cable C to the outside. In this embodiment, the later-described cable C is guided from a through hole 15*e* of the lateral side part 15*b* on the left side to the outside of the bracket 15 so that wiring (moving) to a desired position becomes possible. Although not shown in the drawings, a connector for connecting a metal pipe is attached to the through hole 15*e* to allow the cable C to pass through the pipe.

Figure 8:
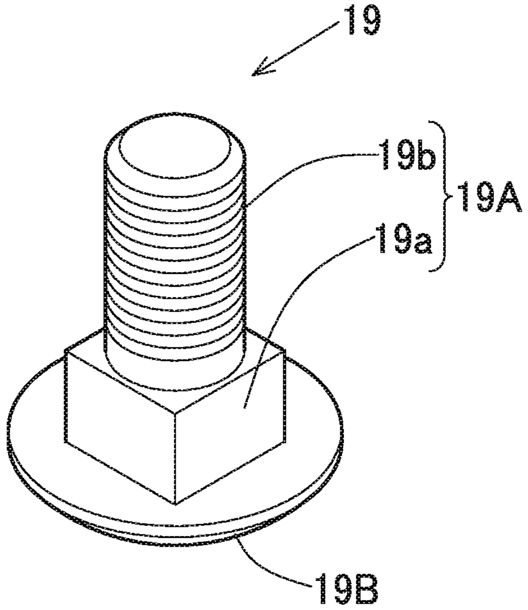
FIG. 8 is a perspective view of a carriage bolt as viewed from diagonally above.

The bottom plate 15*a* includes a pair of left and right (two) cutouts 20, 21 in the front end part in the front-back direction. The pair of cutouts 20, 21 are arranged in the horizontal part 2B of the frame 2 with a distance in the right-left direction of the car K, and allows the insertion of shanks 19A, 19A (see FIG. 3) of carriage bolts 19, 19 that are two bolts set up in the vertical direction. That is, the shanks 19A, 19A can enter the pair of cutouts 20, 21. As shown in FIG. 8, each of the carriage bolts 19, 19 has a substantially hemispherical head 19B arranged on the lower end, and a shank 19A extending upward from the upper end of the head 19B. The shank 19A includes an anti-rotation part 19*a* having a substantially quadratic prism shape extending upward from the upper end of the head 19B, and a screw part 19*b* having a substantially columnar shape extending upward from the upper end of the anti-rotation part 19*a*. A nut N (see FIG. 2, FIG. 3) is screwed to the upper end (i.e., tip end) of each of the shanks 19A, 19A of the carriage bolt 19, 19, and the carriage bolt 19 is tightened by rotation of the nut N in one direction. Further, the tightened carriage bolt 19 is loosened by rotation of the nut N in the other direction opposite to the one direction.

As shown in FIG. 5A, a cutout (i.e., first cutout) 20 on the left side out of the pair of left and right cutouts 20, 21 has an entrance-direction cutout portion (first cutout portion) 20A extending from the car entrance side end in the front-back direction and having a linear shape and a uniform width, and a first width-direction cutout portion (second cutout portion) 20B extending from the rear side end in the front-back direction of the entrance-direction cutout portion 20A and having a linear shape and a uniform width. The cutout on the right side (second cutout) 21 has an entrance-direction cutout portion (first cutout portion) 21A extending from the car entrance side end in the front-back direction and having a linear shape and a uniform width, and a second width-direction cutout portion (second cutout portion) 21B extending from the rear side end in the front-back direction of the entrance-direction cutout portion 21A and having a linear shape and a uniform width. That is, in the pair of left and right cutouts 20, 21, the first width-direction cutout portion 20B and the second width-direction cutout portion 21B extend in directions away from each other (i.e., in the opposite directions) in the right-left direction. The anti-rotation parts 19*a*, 19*a* (see FIG. 8) of the carriage bolts 19, 19 come into (i.e., enter) the pair of left and right cutouts 20, 21, so that the carriage bolts 19, 19 are allowed to move in the cutouts 20, 21 (that is, the carriage bolts 19, 19 can move in the cutouts 20, 21) but are prevented from rotating.

The entrance-direction cutout portions 20A, 21A each have a width in the right-left direction slightly larger than the outer diameter of the anti-rotation parts 19*a*, 19*a* of the carriage bolts 19, 19 to allow the anti-rotation parts 19*a*, 19*a* of the carriage bolts 19, 19 to enter the entrance-direction cutout portions 20A, 21A. The width-direction cutout portions 20B, 21B each have a width in the front-back direction equal to the width in the right-left direction of the entrance-direction cutout portions 20A, 21A, and slightly larger than the outer diameter of anti-rotation parts 19*a*, 19*a* of the carriage bolts 19, 19.

The car door driving device further includes a clamping member 22 that allows the shanks 19A of the carriage bolts 19 to pass therethrough for clamping the bracket 15 between the horizontal part 2B and the clamping member 22.

Figure 6A:
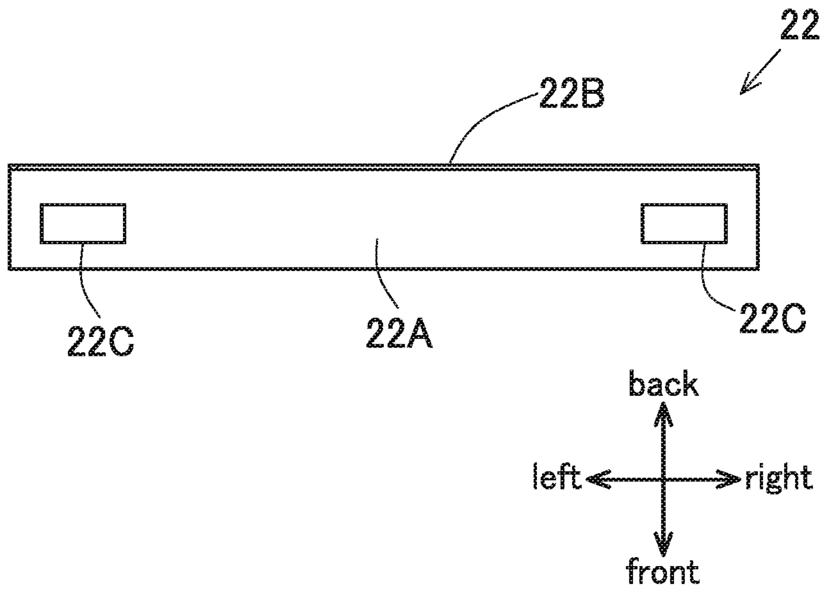
FIG. 6A is a plan view of a clamping member.
Figure 6B:
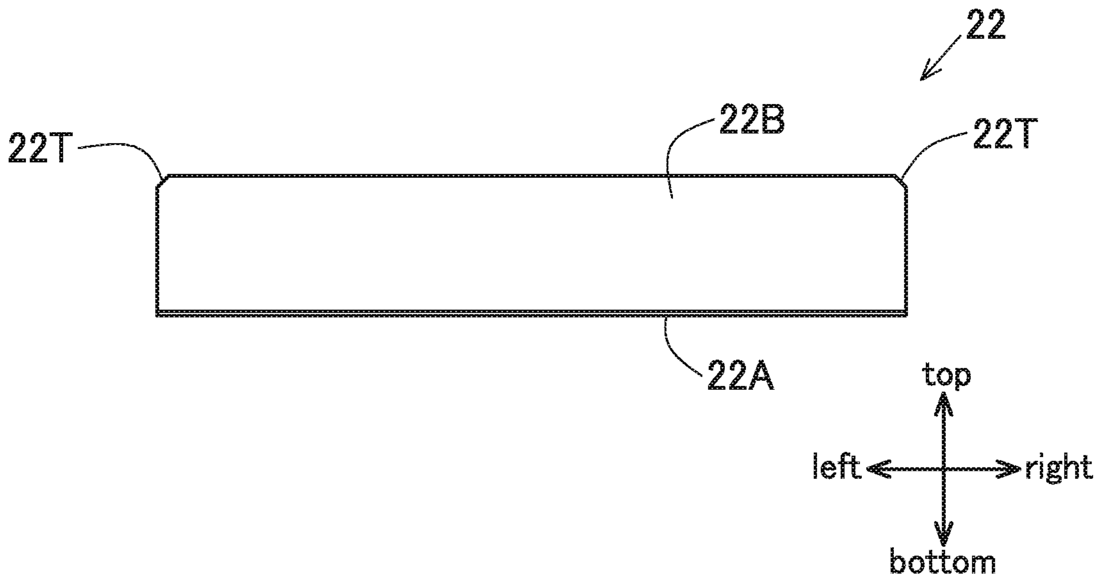
FIG. 6B is a front view of the clamping member.
Figure 6C:
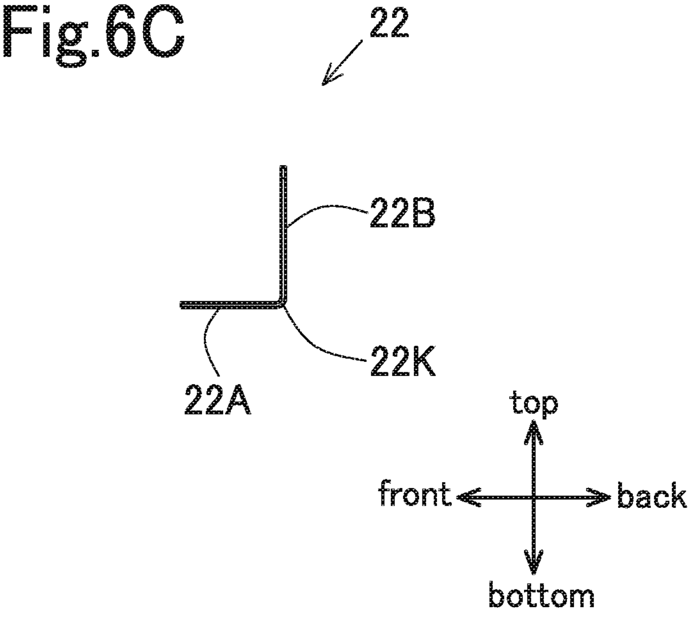
FIG. 6C is a side view of the clamping member.

The clamping member 22 includes a horizontal part (i.e., base part) 22A that is arranged along the horizontal part (bracket attachment part) 2B of the frame 2, and a contact part 22B that is arranged on an end on the far side in the front-back direction (i.e., inner side in the first direction) in the horizontal part 22A and configured to come into contact with the motor 3 to block the movement of the motor 3 to the near side in the front-back direction. The clamping member 22 of this embodiment is formed by a plate member made of metal, and as shown in FIG. 6A, FIG. 6B, and FIG. 6C, includes a horizontal part 22A that has a rectangular shape elongated in the right-left direction and is in contact with the upper surface on the front side in the front-back direction of the bracket 15 (see FIG. 2), and a contact part 22B that is located on the side away from the car entrance 1 of the horizontal part 22A to come into contact with the front end in the front-back direction of the motor 3 to block the motor 3 from moving toward the car entrance side and that has a dimension in the right-left direction equal to that of the horizontal part 22A. The horizontal part 22A has left and right ends each provided with a long hole (i.e., second penetrating part) 22C having a rectangular shape elongated in the right-left direction. With each of the anti-rotation part 19*a* of the carriage bolt 19 held in the long hole 22C, the long hole 22C allows the carriage bolt 19 to move only in the right-left direction.

The contact part 22B is formed by bending upward 90 degrees a portion of the clamping member 22, the portion including an end part on the side away from the car entrance 1. A corner 22K (see FIG. 6C) formed at a boundary between the contact part and the remaining part (i.e., horizontal part 22A) in the clamping member 22 has an arc shape with a certain radius of curvature (or can be a chamfered part formed in an inclined plane that is inclined upward and backward in the front-back direction). Each of the upper end corners 22T at the ends in the right-left direction of the contact part 22 is chamfered with a diagonal cut.

Figure 2:
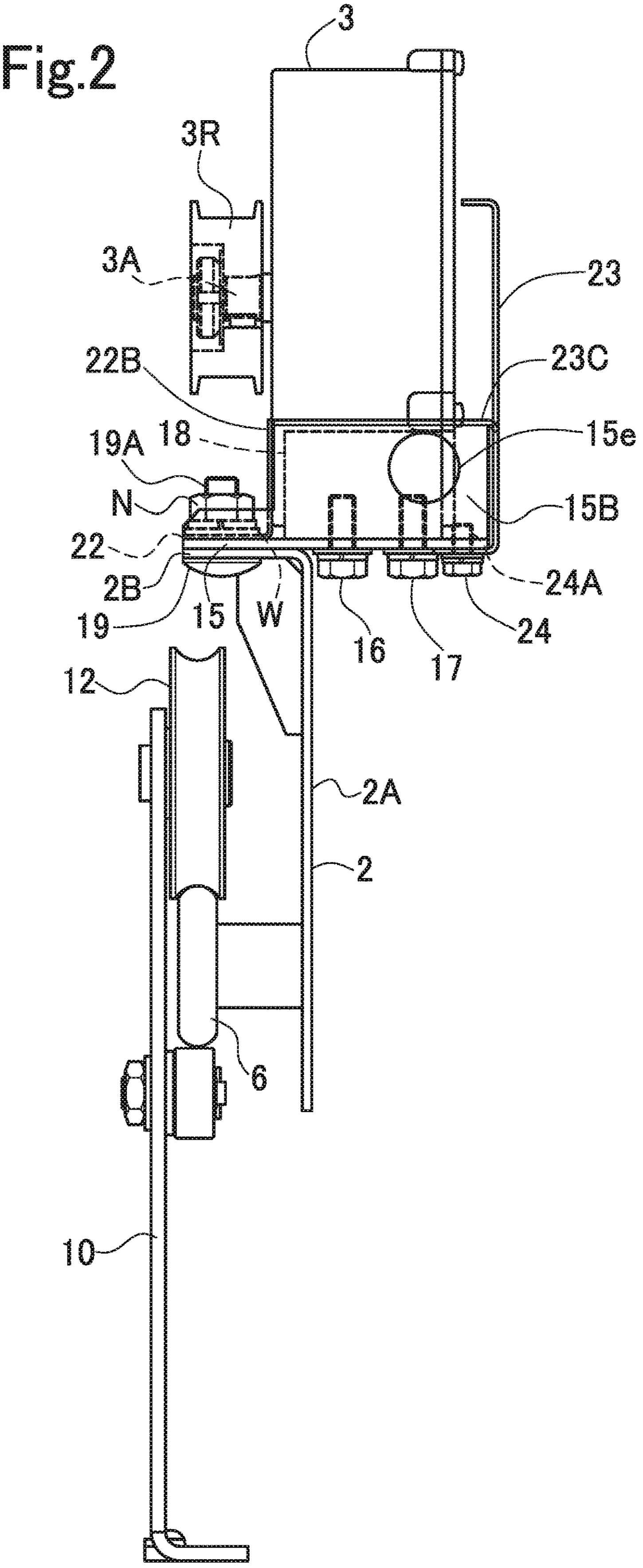
FIG. 2 is a side view of the elevator motor mounting structure as viewed from a lateral side.
Figure 3:
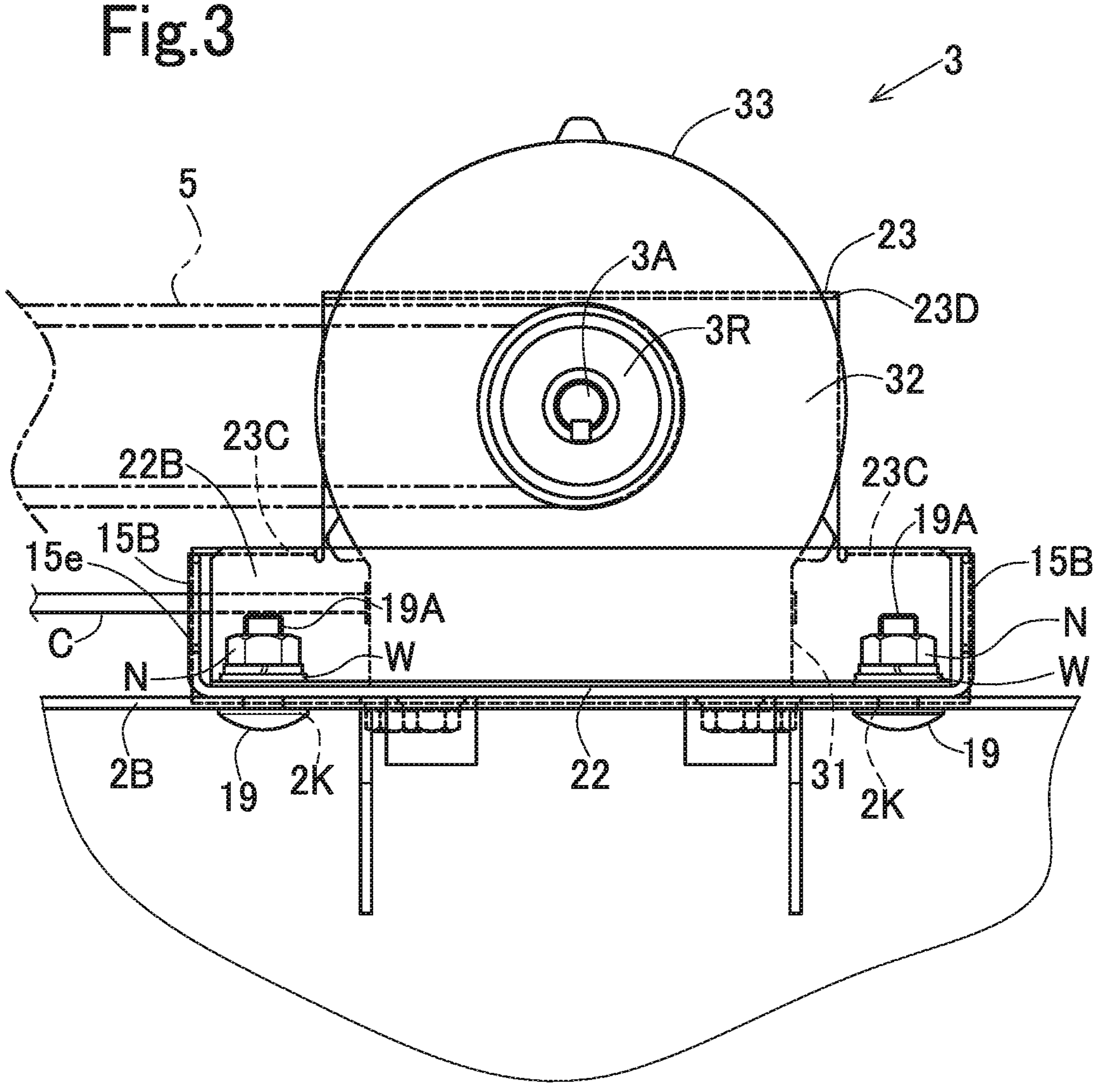
FIG. 3 is a front view of the elevator motor mounting structure as viewed from a front side.
Figure 4:
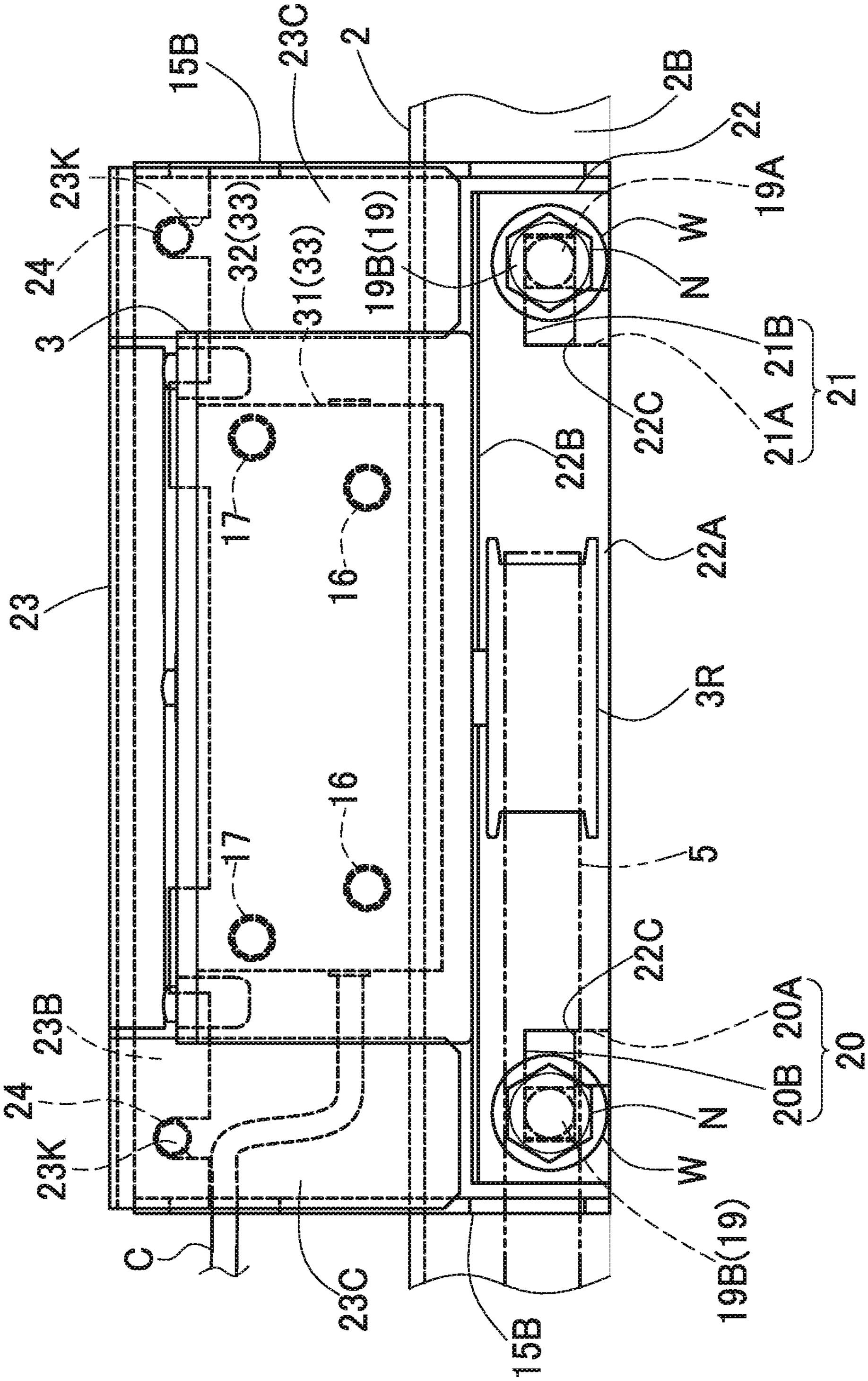
FIG. 4 is a plan view of the elevator motor mounting structure as viewed from above.

The motor 3 is housed in a casing 33. As shown in FIG. 3 and FIG. 4, the casing 33 includes a lower part 31 formed into a rectangular tube shape, and an upper part 32 connected to an upper end of the lower part 31 and formed into a circular arc shape in a plan view of FIG. 3. The cable C projects from the left end in the right-left direction of the casing 33 to the left side. The cable C is a sheathed cable composed of a bundle of, for example, a power wire and a signal wire from an encoder for detecting the rotation speed of the motor 3, a signal wire for the operation of driving and stopping the motor 3, and a power wire of the motor 3. Further, the bottom part and the left and right side parts of the lower part 31 are covered with the bottom cover 18 (see FIG. 2). The cover member 23 for covering the motor 3 from the rear side in the front-back direction is fixed to the bracket 15 by bolts.

The cover member 23 is a plate-shaped member made of metal, and as shown in FIG. 2 to FIG. 4 and FIG. 7A to FIG. 7C, includes a body part 23A having a projecting shape in a plan view, an attachment part 23B in contact with the lower surface of the rear end part in the front-back direction of the bracket 15, a pair of right and left first horizontal parts 23C, 23C, and a second horizontal part 23D. The body part 23A has a plate-shaped first plate part 23*a* having a rectangular shape elongated in the right-left direction, and a second plate part extending upward from a central part in the right-left direction of the first plate part 23*a* and covering the motor 3 from the rear side in the front-back direction. The attachment part 23B extends toward the front side of the front-back direction from the lower end of the first plate part 23*a* in a direction in which the attachment part 23B is oriented at 90 degrees relative to the first plate part 23*a*. Each of the first horizontal parts 23C, 23C extends toward the front side of the front-back direction from the upper end of the opposite ends in the right-left direction of the first plate part 23*a* in a direction in which each of the first horizontal parts 23C, 23C is oriented in the right-left direction at 90 degrees relative to the first plate part 23*a*. The second horizontal part 23D extends toward the front side of the front-back direction from the upper end of a second plate part 23*b* in a direction in which the second horizontal part 23D is oriented at 90 degrees relative to the second plate part 23*b*.

The first horizontal part 23C is configured to serve as a covering part for covering from above the cable C that projects toward the lateral side of the motor 3. The first horizontal part 23C extends to be located near the rear end of the contact part 22B of the clamping member 22 (see FIG. 4). A cutout 23K that allows the shank 24A of the bolt 24 shown in FIG. 2 to enter is formed at each of the opposite ends in the right-left direction of the attachment part 23B. Each of the cutouts 23K extends rearward from the front end of the attachment part 23B and is formed into a U-shaped cutout with an arc rear end. Accordingly, the bolts 24 are screwed into the screw holes 15*d*, 15*d* of the bracket 15 (see FIG. 5(*a*)) to such an extent that the shanks 24A of the bolts 24 can enter the cutouts 23K of the cover member 23. While maintaining this state, the cover member 23 is moved forward to allow the shanks 24A, 24A of the bolts 24, 24 to enter the pair of right and left cutouts 23K, 23K of the cover member 23. The bolts 24, 24 are tightened after this movement so that the cover member 23 is fixed to the bracket 15.

Figure 11:
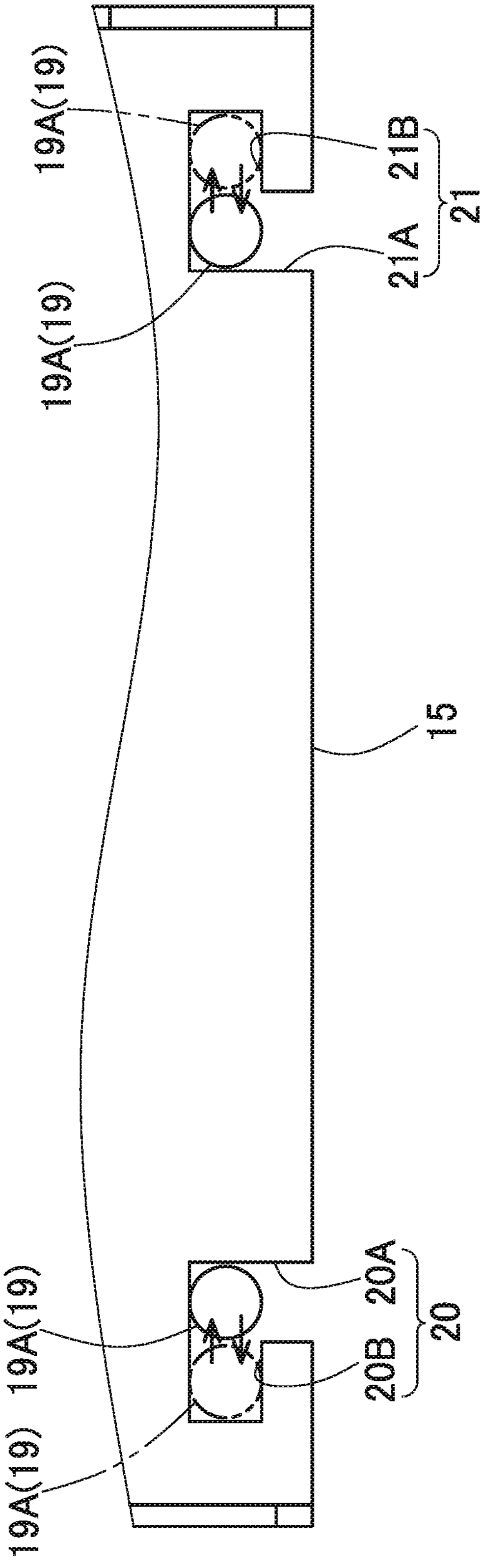
FIG. 11 is a plan view showing a state where a bolt located on a second cutout portion moves in a right-left direction.

Needs for replacement of the motor sometimes arise due to, for example, the malfunction or degradation over time. FIG. 1 and FIG. 2 show the case where the motor 3 is installed on the outer side in the width direction than the width of the car entrance. In this case, the replacement is performed from above the car K, which makes it harder to replace the motor 3. When the replacement of the motor 3 is performed, in FIG. 2, nuts N, N are first rotated for removing the motor 3 that is installed on the horizontal part 2B of the frame 2 to loosen the carriage bolts 19, 19 that have been tightened. At this time, even when the carriage bolts 19, 19 are loosened, the second cutout portions 20B, 21B suppress the bracket 15 from moving in the front-back direction, and therefore the bracket 15 is suppressed from being removed from the carriage bolts 19, 19 in the front-back direction. Thereafter, the carriage bolt 19 on the left side of the second cutout portion 20B (see the two-dotted line on the left side in FIG. 11) is moved to the right end (see the solid line on the left side in FIG. 11). Subsequently, the carriage bolt 19 on the right end of the second cutout portion 21B (see the two-dotted line on the right side in FIG. 11) is moved to the left end (see the solid line on the right side in FIG. 11). Thereafter, the bracket 15 is moved backward in the front-back direction to allow the shanks 19A, 19A of the carriage bolts 19, 19, which have moved to the respective rear ends in the front-back direction of the pair of the right and left first cutout portions 20A, 21A, to move to the front end in the front-back direction of the first cutout portions 20A, 21A. Thereby, the bracket 15 is removed from the shanks 19A, 19A of the carriage bolts 19, 19. The motor 3 is thus removed together with the bracket 15.

Figure 9:
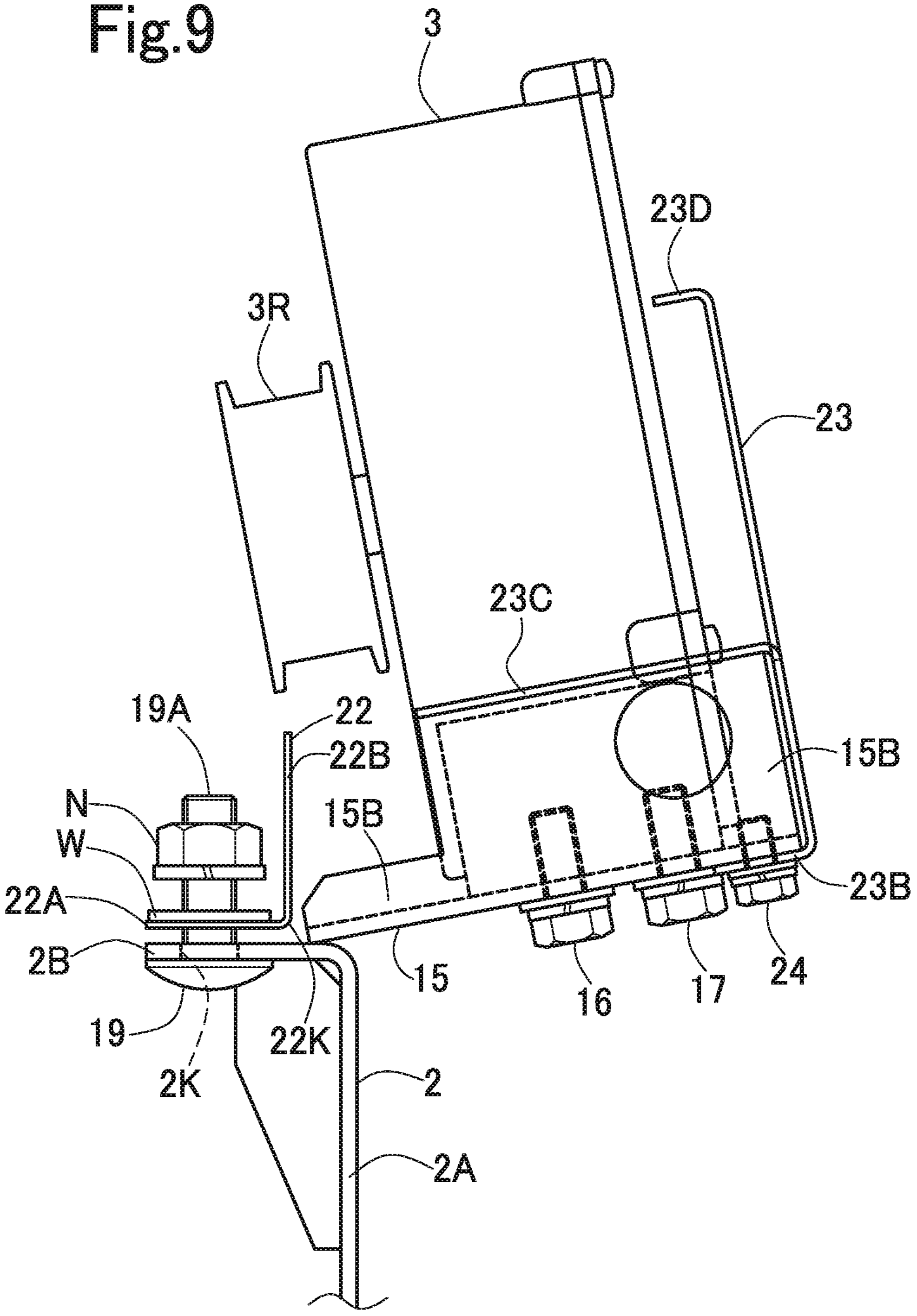
FIG. 9 is a side view showing a state immediately before the bracket with the motor mounted thereon is inserted between the horizontal part and the clamping member.
Figure 10:
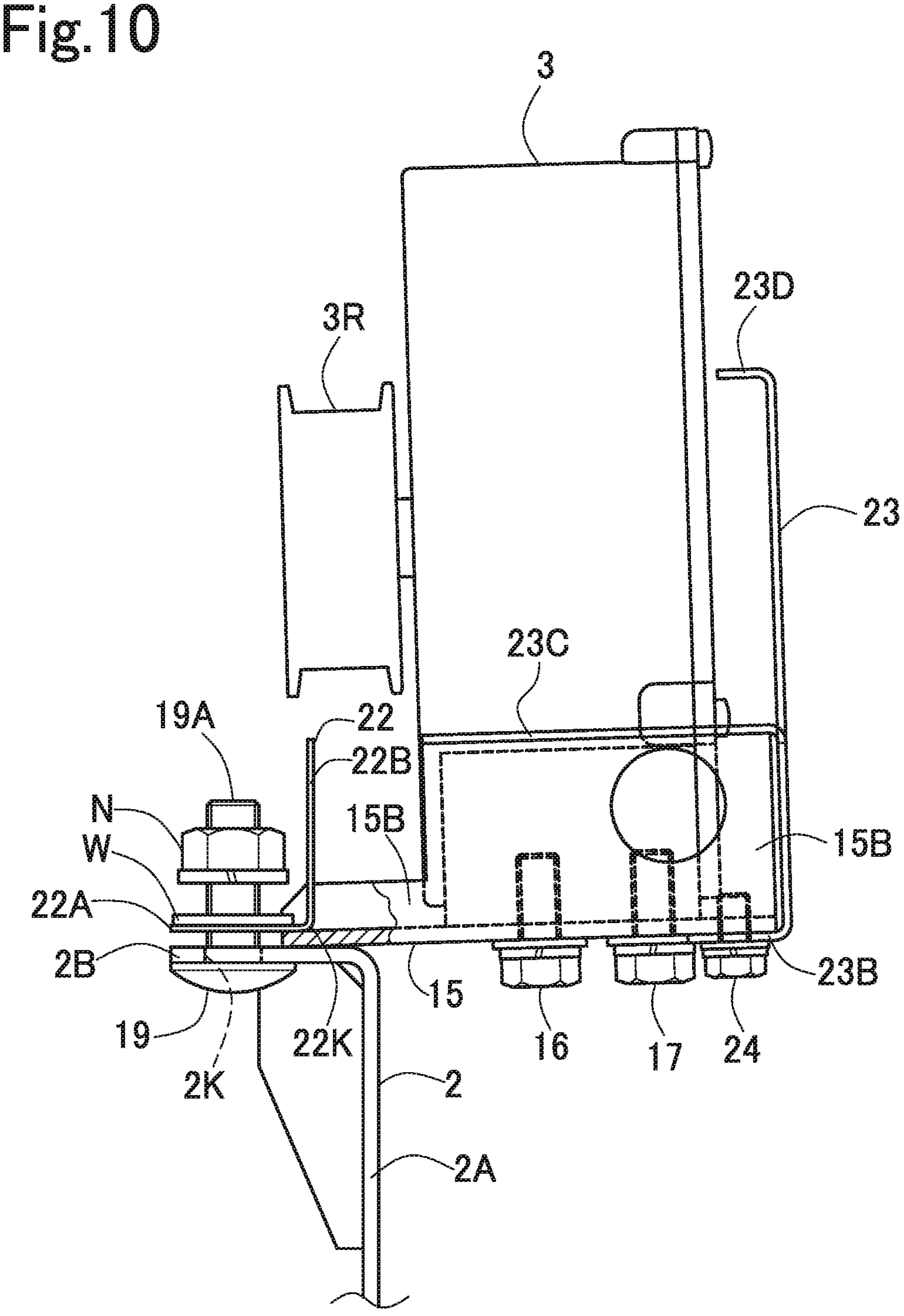
FIG. 10 is a side view showing a state where the bracket with the motor mounted thereon is inserted between the horizontal part and the clamping member.

Next, when the mounting of a new motor is performed, the bracket 15 is moved forward to allow the shanks 19A, 19A of the carriage bolts 19, 19 to enter the corresponding two entrance-direction cutout portions 20A, 21A. FIG. 9 shows the state immediately before the bracket 15 is moved forward. A reference sign W in FIG. 9 denotes a washer. Next, the carriage bolt 19 on the left side (see the solid line on the left side in FIG. 11) located on the rear side end in the front-back direction of the entrance-direction cutout portion 20A of the first cutout 20 on the left side is moved to the position of the first width-direction cutout portion 20B at the left side end represented by the two-dotted line. At the same time, the carriage bolt 19 (see the solid line on the right side in FIG. 11) located at the rear side end in the front-back direction of the entrance-direction cutout portion 21A of the second cutout 21 on the right side is moved to the position of the second width-direction cutout portion 21B at the right side end represented by the two-dotted line. In this state where the carriage bolts 19, 19 have been moved, the bracket 15 for supporting the motor 3 is not necessary to be supported by the hand. Thus, the bracket 15 with the motor 3 mounted thereon is fixed to the horizontal part 2B of the frame 2 only by rotating the nuts N, N to tighten the carriage bolts 19, 19, thereby the mounting of the motor 3 is completed. In consequence, the replacement of the motor can be easily made. In the state where the bracket 15 is clamped between the horizontal part 2B and the clamping member 22, the motor 3 is in contact with the contact part 22B and thus can be blocked from moving to the car entrance 1 side and falling in the shaft through which the car K moves up and down.

Further, since the corner 22K, which is formed by bending the contact part 22B (that is, the corner which is a boundary between the horizontal part 22A and the contact part 22B), has an arc shape with a certain radius of curvature (or can be a chamfered part). Thus, when the bracket 15 is inserted into between the clamping member 22 and the horizontal part 2B, the bracket 15 is pressed onto the corner 22K that has an arc shape with a certain radius of curvature (or can be a chamfered part) to cause the clamping member 22 to easily move upward so as to expand the gap relative to the horizontal part 2B. With this configuration, the operation to insert the bracket 15 is easily performed. Also, the clamping member 22 further includes long holes 22C, 22C (see FIG. 6A, FIG. 4) that are a plurality of second grooves (i.e., second penetrating parts) provided to correspond to a plurality of grooves (two grooves in this embodiment) (i.e., first penetrating parts) 2K, 2K (FIG. 9 shows only one of the grooves that are elongated in the direction orthogonal to the paper surface of FIG. 9) each having a rectangular shape and elongated in the right-left direction in the horizontal part 2. The long holes 22*c*, 22*c* (see FIG. 6A, FIG. 4) are configured to allow the movement of the carriage bolts 19, 19. With this configuration, the carriage bolts 19, 19 can be smoothly moved.

Furthermore, since the cover member 23 for covering the motor 3 from the rear side in the front-back direction is attached to the bracket 15, the rigidity of the casing 33 of the motor 3 can be improved, and thereby the motor 3 is protected against the external shocks. Further, as shown in FIG. 3, the first horizontal part 23C on the left side, which is a covering part of the cover member 23, and the lateral side part 15B on the left side of the bracket 15 cover the connecting part at a base part of the cable C from above and the lateral side, and thus the cable C drawn out to the outside via the through hole 15*e* that is formed in the lateral side part of the bracket 15 can be wired to a desired position.

Various modifications can be made without departing from the gist of the present invention. In addition, a specific configuration of each part is not limited to the aforementioned embodiment.

In the aforementioned embodiment, the car doors 7, 8 are center parting doors configured to move in the opposite directions to open and close the entrance, but can be side sliding doors configured to move in the same direction to open and close the entrance. The number of car doors can be changed as desired.

In the aforementioned embodiment, the horizontal part 2B is formed by bending the upper end part of the frame 2, but can be formed by fixing a separately formed horizontal plate member to the upper end of the frame by welding or bolt. The horizontal part 2B extends toward the landing door side (i.e, front side in the front-back direction), but can extend to the side away from the landing floor side (i.e, rear side in the front-back direction).

In the aforementioned embodiment, the bracket 15 includes two cutouts 20, 21, but can include any number of cutouts such as one cutout or three or more cutouts. Further, one cutout (i.e., first cutout) 20 out of the plurality of cutouts 20, 21 has the entrance-direction cutout portion 20A and the first width-direction cutout portion 20B extending from the rear end in the front-back direction of the entrance-direction cutout portion 20A toward the left side, and the other cutout (i.e, second cutout) 21 has the entrance-direction cutout portion 21A and the second width-direction cutout portion 21B extending from the rear end in the front-back direction of the entrance-direction cutout portion 21A, but the present invention is not limited to this configuration. It can be configured such that one cutout 20 has the entrance-direction cutout portion 20A and a second width-direction cutout portion extending from the rear end in the front-back direction of the entrance-direction cutout portion 20A to the right side, and the other cutouts 21 has the entrance-direction cutout portion 21A and a first width-direction cutout portion extending from the rear end in the front-back direction of the entrance-direction cutout portion 21A to the left side. That is, the first cutout 20 and the second cutout 21 can be arranged in reverse positions in the right-left direction relative to the positions in the aforementioned embodiment. Further, it can be configured such that one cutout 20 has the entrance-direction cutout portion 20A and a first width-direction cutout portion (or a second width-direction cutout portion) extending from the rear end in the front-back direction of the entrance-direction cutout portion 20A to the left side (or the right side), and the other cutouts 21 has the entrance-direction cutout portion 21A and a first width-direction cutout portion (or a second width-direction cutout portion) extending from the rear end in the front-back direction of the entrance-direction cutout portion 21A to the left side (or the right side). That is, a plurality of cutouts of the same configuration each including the width-direction cutout portion extending toward the same side in the right-left direction. In other words, any of the two cutouts can be the first cutout or can be the second cutout. In the case where the replacement of the motor is performed using ae bracket including the plurality of cutouts of the same configuration, first, the tightened bolts are loosened for removing the motor. At this time, even though the bolts are loosened, the width-direction cutout portions suppress the bracket from moving in the depth direction, thereby suppressing the bracket from being released from the bolts. Then, the bracket is moved to cause the shanks of the bolts located in the width-direction cutout portions to be moved to the entrance-direction cutout portions. Thereafter, the bracket is moved to the far side in the depth direction (i.e., rear side in the front-back direction) to cause the shanks of the bolts having moved to the far side in the depth direction (i.e., rear side in the front-back direction) of the entrance-direction cutout portions to be moved to the near side in the depth direction (i.e., front side in the front-back direction). The bracket is thus released from the shanks of the bolts to remove the motor. Next, when a new motor for replacement is mounted, the bracket is moved to cause the shanks of the bolts to be inserted into the entrance-direction cutout portions extending in the far side in the depth direction (i.e., rear side in the front-back direction) of the bracket that supports the motor. Next, the bracket is moved to cause the shanks of the bolts to be moved from the far side ends in the depth direction (i.e., rear side end in the front-back direction) of the entrance-direction cutout portions to the width-direction cutout portions, so that the width-direction cutout portions suppress the bracket from moving to the far side in the depth direction (i.e., rear side in the front-back direction) and being released from the shanks of the bolts even when the hand is released from the bracket. In this state, the bracket for supporting the motor does not need to be supported by the hand. Thus, the bracket is fixed to the horizontal part of the frame to complete the mounting of the new motor only by tightening the bolts.

In the aforementioned embodiment, the contact part 22B is formed by bending a portion of the clamping member 22 on the side away from the car entrance (i.e., rear side in the front-back direction). However, a separately formed contact part can be fixed to the clamping member 22 by welding or bolt. Alternatively, the clamping member 22 can be eliminated.

In the aforementioned embodiment, provided is the width-direction cutout portion that extends in the right-left direction that extends from the rear side end of the front-back direction of the entrance-direction cutout portion in the direction orthogonal to the entrance-direction cutout portion. However, a width-direction cutout portion that extends from the rear side end of the entrance-direction cutout portion in a direction substantially orthogonal to the entrance-direction cutout portion can be provided.

In the aforementioned embodiment, the carriage bolt 19 is used, but a universal bolt formed by a head and a shank can be used.

The elevator motor mounting structure of this embodiment is described above, but is not limited to the aforementioned embodiment and can be subjected to various modifications within the intended scope of the present invention. Further, the operation and effect of the present invention are not limited to the above embodiments. That is, the embodiments disclosed herein should be considered to be illustrative in all respects and not restrictive. The scope of the present invention is indicated by the appended claims, not by the above description. It is also contemplated that the scope of the present invention includes all modifications within the meaning and scope of equivalence to the claims.

What is claimed is:

1. An elevator motor mounting structure comprising:

a bracket attachment part which a frame arranged above a car entrance includes;

a bracket that is attached to the bracket attachment part and supports a motor for opening and closing operation of a car door;

a bolt for fixing the bracket to the bracket attachment part while passing through the bracket attachment part, wherein the bracket comprises a cutout that allows a shank of the bolt to enter the cutout when the bracket is attached to the bracket attachment part of the frame, the cutout has, when an entrance direction of the car entrance in a plan view is a first direction and a width direction of the car entrance orthogonal to the first direction in a plan view is a second direction, an entrance-direction cutout portion that extends inward of a car from a side end of the bracket in the first direction, the side end facing outward of the car from the car entrance in the first direction, and a width-direction cutout portion that extends from an inner end of the entrance-direction cutout portion along the second direction, the side end facing outward of the car from the car entrance in the entrance-direction cutout portion is open, the bolt is composed of a plurality of bolts and the cutout is composed of a plurality of cutouts, respectively, the plurality of cutouts include at least one first cutout and at least one second cutout, the at least one first cutout has the entrance-direction cutout portion and a first width-direction cutout portion that extends from the entrance-direction cutout portion toward one side in the second direction, the at least one second cutout has the entrance-direction cutout portion and a second width-direction cutout portion that extends from the entrance-direction cutout portion toward an other side in the second direction, and the bracket attachment part further comprises a plurality of first penetrating parts configured to allow the bolt located at the inner end of the entrance-direction cutout portion of the at least one first cutout to move toward one end side of the first width-direction cutout portion, and allow the bolt located at the inner end of the entrance-direction cutout portion of the at least one second cutout to move toward an other end side of the second width-direction cutout portion, further comprising:

a clamping member through which shanks of the plurality of bolts pass so as to clamp the bracket between the bracket attachment part and the clamping member, the clamping member comprising:

a base part arranged along the bracket attachment part; and a contact part arranged at an end on the inner side in the first direction in the base part and configured to come into contact with the motor to block the motor from moving outward in the first direction, the base part having a plurality of second penetrating parts arranged to correspond in position to the plurality of first penetrating parts of the bracket attachment part to allow movement of the bolts.

2. The elevator motor mounting structure according to claim 1, wherein the base part extends in the first direction and the second direction, the contact part extends in the second direction and a vertical direction, and a corner formed on a boundary between the contact part and the clamping part has an arc shape with a certain radius of curvature or is a chamfered part.

3. The elevator motor mounting structure according to claim 1, comprising:

a cover member that is attached to the bracket and covers the motor from the inner side in the first direction, wherein the cover member has a covering part extending from a position inside the contact part to a position outside the contact part in the second direction to cover from above a cable that projects toward the one side of the motor in the second direction, the bracket has a lateral side part extending upward from a position on the one side of the motor in the second direction and covering the motor when viewed from the second direction, and the lateral side part has a through hole to guide the cable to the outside.

* * * * *